(12) United States Patent
Commaret et al.

(10) Patent No.: US 9,279,588 B2
(45) Date of Patent: Mar. 8, 2016

(54) COMBUSTION CHAMBER OF AN AERONAUTICAL TURBINE ENGINE WITH COMBUSTION HOLES HAVING DIFFERENT CONFIGURATIONS

(75) Inventors: Patrice Andre Commaret, Rubelles (FR); Thomas Olivier Marie Noel, Vincennes (FR)

(73) Assignee: SNECMA, Paris (FR)

( * ) Notice: Subject to any disclaimer, the term of this patent is extended or adjusted under 35 U.S.C. 154(b) by 949 days.

(21) Appl. No.: 13/497,204

(22) PCT Filed: Sep. 21, 2010

(86) PCT No.: PCT/FR2010/051970
§ 371 (c)(1),
(2), (4) Date: Mar. 20, 2012

(87) PCT Pub. No.: WO2011/033242
PCT Pub. Date: Mar. 24, 2011

(65) Prior Publication Data
US 2012/0186222 A1    Jul. 26, 2012

(30) Foreign Application Priority Data
Sep. 21, 2009    (FR) ..................................... 09 56467

(51) Int. Cl.
*F23R 3/50* (2006.01)
*F23R 3/06* (2006.01)
(Continued)

(52) U.S. Cl.
CPC ... *F23R 3/50* (2013.01); *F23R 3/06* (2013.01); *F23R 3/10* (2013.01); *F23R 3/26* (2013.01); *F23N 2027/00* (2013.01)

(58) Field of Classification Search
CPC ................ F23R 3/06; F23R 3/50; F23R 3/26; F23R 3/10; F23N 2027/00; F02C 1/00; F02G 3/00
See application file for complete search history.

(56) References Cited

U.S. PATENT DOCUMENTS 5,289,656 A * 3/1994 Vetter .............................. 49/250
5,289,686 A    3/1994 Razdan et al.
(Continued)

FOREIGN PATENT DOCUMENTS

EP    1 092 925    4/2001
EP    2 053 312    4/2009
(Continued)

OTHER PUBLICATIONS

Office Action issued May 27, 2014, in Japanese Patent Application No. 2012-529332 with English translation.
(Continued)

*Primary Examiner* — William H Rodriguez
*Assistant Examiner* — Carlos A Rivera
(74) *Attorney, Agent, or Firm* — Oblon, McClelland, Maier & Neustadt, L.L.P.

(57) ABSTRACT

A combustion chamber for an aviation turbine engine, the combustion chamber being annular about a longitudinal axis and including an outer side wall, an inner side wall, and an annular chamber end wall connecting one end of the outer side wall to one end of the inner side wall. The outer side wall includes, distributed along its circumference, spark plugs, primary holes, and dilution holes situated downstream from the primary holes in the direction of the longitudinal axis. The primary holes situated in each of the adjacent zones adjacent to one of the spark plugs present a configuration that is different from the configuration of the primary holes situated outside the zones, such that the supply of air in the adjacent zones is different from the supply of air outside the zones.

9 Claims, 2 Drawing Sheets

(51) Int. Cl.
*F23R 3/10* (2006.01)
*F23R 3/26* (2006.01)

(56) References Cited

U.S. PATENT DOCUMENTS

| | | | | |
|---|---|---|---|---|
| 5,297,385 | A * | 3/1994 | Dubell et al. | 60/804 |
| 6,070,412 | A * | 6/2000 | Ansart et al. | 60/747 |
| 6,266,961 | B1 * | 7/2001 | Howell et al. | 60/752 |
| 7,614,235 | B2 * | 11/2009 | Burd et al. | 60/754 |
| 2008/0127651 | A1 * | 6/2008 | Zupanc | F23R 3/06 60/752 |
| 2009/0100840 | A1 * | 4/2009 | Campion et al. | 60/754 |
| 2011/0219774 | A1 * | 9/2011 | Bronson | F23R 3/50 60/752 |
| 2011/0271678 | A1 * | 11/2011 | Bourgois et al. | 60/722 |

FOREIGN PATENT DOCUMENTS

| | | |
|---|---|---|
| JP | 9-4845 A | 1/1997 |
| JP | 11-201453 A | 7/1999 |
| JP | 2001-193484 A | 7/2001 |
| JP | 2009-103438 A | 5/2009 |

OTHER PUBLICATIONS

International Search Report Issued Apr. 1, 2011 in PCT/FR10/51970 Filed Sep. 21, 2010.

* cited by examiner

COMBUSTION CHAMBER OF AN AERONAUTICAL TURBINE ENGINE WITH COMBUSTION HOLES HAVING DIFFERENT CONFIGURATIONS

BACKGROUND OF THE INVENTION

1. Field of the Invention

The present invention relates to the field of combustion chambers for aviation turbine engines. More particularly, the invention relates to a combustion chamber for an aviation turbine engine, the combustion chamber being annular about a longitudinal axis A, being defined by an outer side wall, an inner side wall, and an annular chamber end wall connecting one end of the outer side wall to one end of the inner side wall, the outer side wall including, distributed along its circumference, spark plugs, primary holes, and dilution holes situated downstream from the primary holes in the direction of the longitudinal axis A.

In the description below, the terms "upstream" and "downstream" are defined relative to the normal flow direction of air through the combustion chamber. The terms "inner" and "outer" relate to the region inside and to the region outside the combustion chamber, respectively.

2. Description of the Related Art

FIG. 1 is a longitudinal section view of a sector of a combustion chamber 10 of an aviation turbine engine. The combustion chamber 10 is annular about a longitudinal axis A. It is defined by an outer side wall 12 that is substantially cylindrical about the axis A, by an inner side wall 14 that is substantially cylindrical about the axis A and of mean diameter less than the mean diameter of the outer side wall 12, and by an annular chamber end wall 13 that connects one end of the outer side wall 12 to the facing end of the inner side wall 14 so as to close the upstream end of the combustion chamber 10. Thus, the mean surface passing through the combustion chamber 10 from the chamber end wall 13 to the downstream end 15 is a cone about the longitudinal axis A. The line of intersection between this cone and a plane containing the longitudinal axis A is referenced C in FIG. 1.

The chamber end wall 13 has a plurality of fuel injector systems 33 that inject fuel into the combustion chamber 10. The injector systems 33 are distributed around the longitudinal axis A.

Air penetrates into the combustion chamber 10 via the chamber end wall 13, via primary holes 100, via dilution holes 200, and via cooling holes (not shown), all of these holes being in the outer side wall 12, and also via primary holes 110, dilution holes 210, and cooling holes (not shown), all of these holes being in the inner side wall 14.

Spark plugs 36 (visible in FIG. 4) are situated substantially level with the primary holes 100 and they are distributed regularly around the outer side wall 12 about the longitudinal axis A.

In the configuration shown in FIG. 1, the combustion chamber 10 has two spark plugs 36 (see FIG. 4), which are thus diametrically opposite about the axis A.

Such a combustion chamber is designed to operate at a variety of altitudes. Present standards require combustion chambers to be suitable for operating at altitudes that are ever higher. In particular, in the event of combustion being interrupted, a combustion chamber must be capable of being re-ignited at the highest possible altitude, referred to as the re-ignition ceiling.

High altitude re-ignition tests on combustion chambers have shown that in order to increase the re-ignition ceiling, and thus the ability of a combustion chamber to re-ignite at a higher altitude, it is necessary:

either to reduce the percentage of air that is introduced into the combustion chamber via the primary holes (relative to the total quantity of air passing through the combustion chamber);

or else to increase the volume $V_{ZP}$ of the primary zone so that air is distributed in constant manner within the combustion chamber (i.e. the distribution of air between the various air inlets into the combustion chamber is constant). The primary zone is defined as the region of the combustion chamber that extends between the chamber end wall and the plane containing the primary holes.

Both of those solutions suffer from the drawbacks of giving rise to an increase in the level of smoke and in the level of $NO_x$ emitted by the combustion chamber.

In present combustion chambers, obtaining a higher re-ignition ceiling thus runs the risk of no longer being capable of satisfying pollution standards, particularly since these standards are becoming ever more severe.

BRIEF SUMMARY OF THE INVENTION

The invention seeks to provide a combustion chamber that can be re-ignited at a higher altitude (high re-ignition ceiling), while satisfying the pollution standards that are in force.

This object is achieved by the fact that the primary holes situated in each of the adjacent zones adjacent to one of the spark plugs presents a configuration that is different from the configuration of the primary holes situated outside the zones, in such a manner that the supply of air in the adjacent zones is different from the supply of air outside the zones.

By means of these arrangements, a high re-ignition ceiling is conserved, and this ceiling is possibly even raised, while the production of smoke and of $NO_x$ is simultaneously controlled, thus making it possible to satisfy pollution standards.

In a first embodiment of the invention, the primary holes situated in each of the adjacent zones adjacent to one of the spark plugs are situated further downstream than the primary holes situated outside the zones.

In a second embodiment of the invention, the ratio $R_1$ of the flow rate of air passing via the primary holes to the flow rate of air passing via the dilution holes in a zone adjacent to one of the spark plugs is less than the ratio $R_2$ of the flow rate of air passing via the primary holes to the flow rate of air passing via the dilution holes outside said zones.

BRIEF DESCRIPTION OF THE SEVERAL VIEWS OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 4:
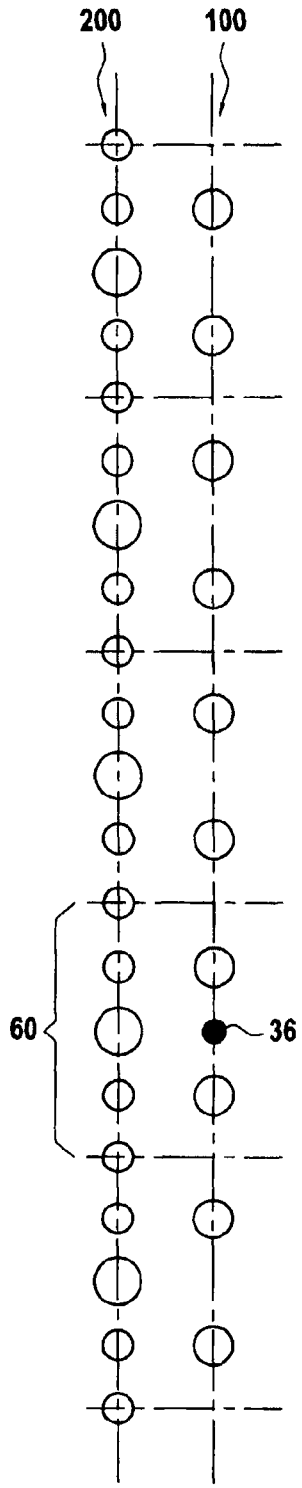
FIG. 4 is a perspective view of a portion of the outer side wall of a combustion chamber of the prior art.

FIG. 4 is a perspective view of a portion of the outer side wall 12 of a prior art combustion chamber 10 as described above. There can be seen primary holes 100 and dilution holes 200, together with one of the two spark plugs 36.

For each spark plug 36, an adjacent zone 60 is defined that is a zone having the primary holes 100 and the secondary holes 200 that are the closest to the spark plug 36. The spark plug 36 is thus situated substantially in the middle of the adjacent zone 60. In the example shown in FIGS. 2 and 3, the adjacent zone 60 has two primary holes 100, and four dilution holes 200 (three dilution holes plus, on each of two boundaries of the adjacent zone, half of a dilution hole astride said boundary). The holes situated further away from this spark plug 36 are situated outside the adjacent zone 60. The situation is analogous for the other spark plug 36.

Alternatively, the adjacent zone 60 around a spark plug 36 may include only two primary holes 100 (one hole on either side of the spark plug 36) and two dilution holes 200 (one hole on either side of the spark plug 36).

The primary holes 100 are situated along a circumference situated on the longitudinal axis A in a plane perpendicular to said axis. The dilution holes 200 are situated along another circumference in a plane parallel to the plane containing the circumference of the primary holes 100, downstream from the primary holes 100 in the direction of the longitudinal axis A.

Surprisingly, the inventors have found that by modifying the characteristics of the primary holes 100 so as to distinguish between the primary holes 100 that are in the adjacent zone 60 compared with the primary holes 100 that lie outside the adjacent zone 60, it is possible to conserve or to increase the re-ignition ceiling, while satisfying the pollution standards in force.

Thus, the inventors have modified the configuration of the primary holes 100 so as to distinguish the primary holes 100 that are in the adjacent zone 60 compared with the primary holes 100 that are outside the adjacent zone 60. The term "configuration of the primary holes" is used to mean, for example, the positions of the primary holes 100, and/or the shapes, and/or the sizes of the primary holes 100.

By having a different configuration for the primary holes 100 that are in the adjacent zones 60 compared with the configuration of the primary holes 100 that lie outside the adjacent zones 60, the supply of air into the adjacent zones 60 is made to differ from the supply of air outside the adjacent zones 60.

Figure 1:
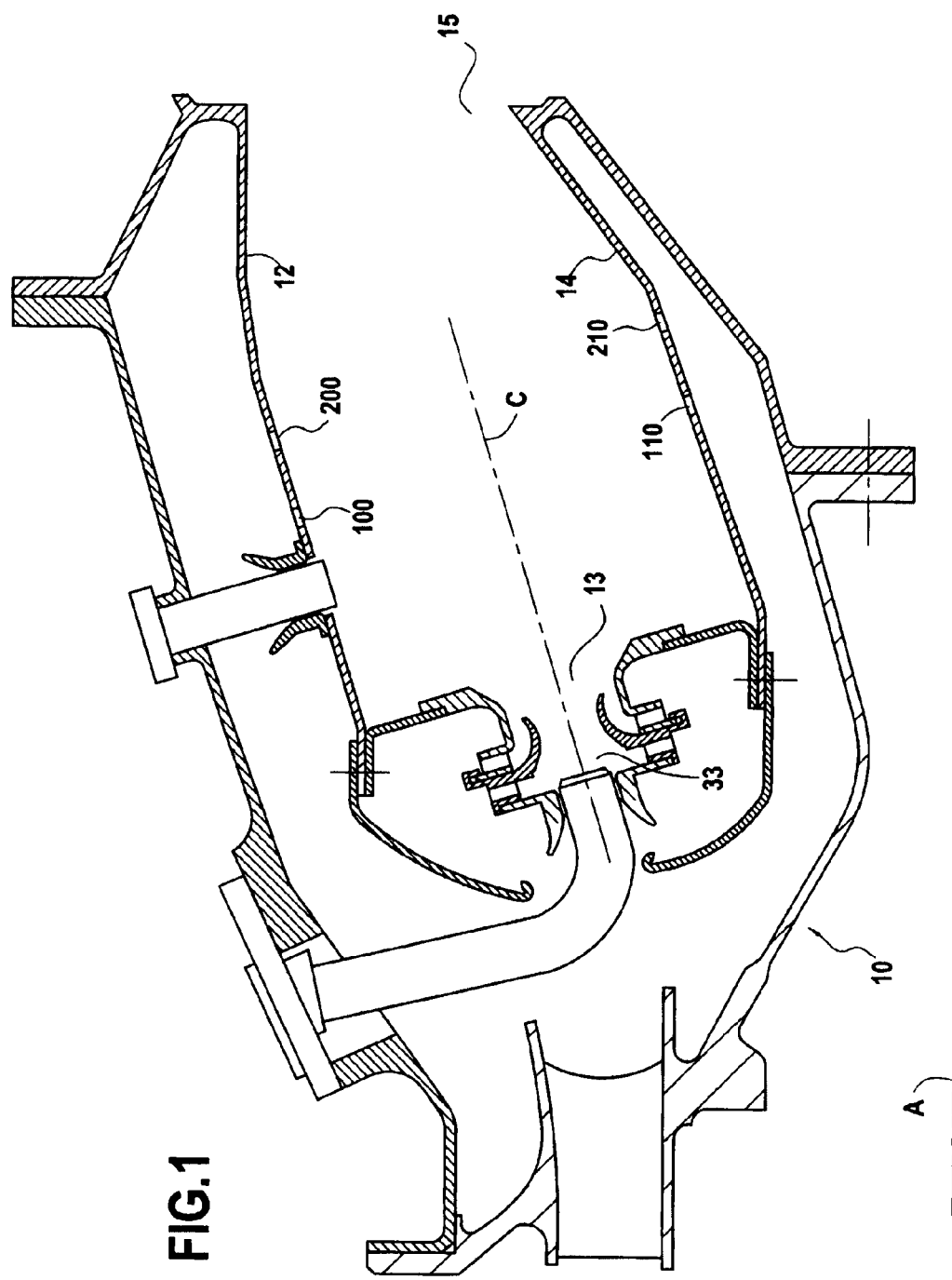
FIG. 1 is a longitudinal section of a sector of a chamber.
Figure 2:
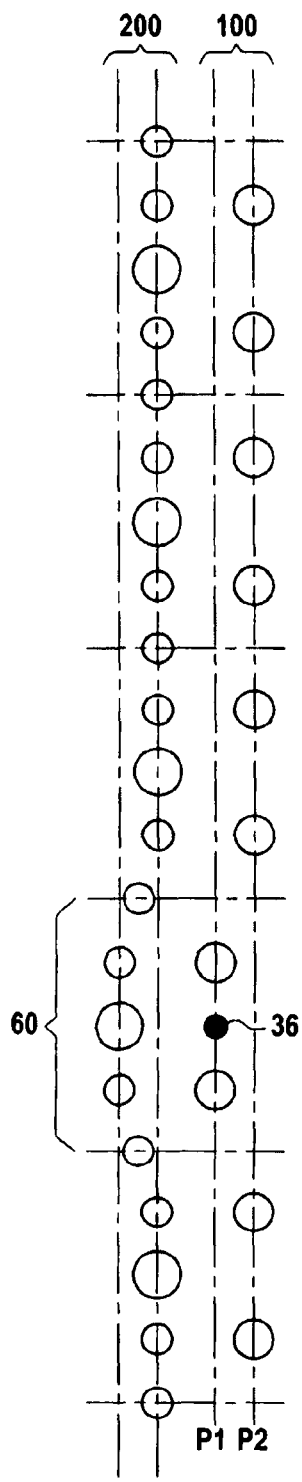
FIG. 2 is a perspective view of a portion of the outer side wall of a combustion chamber in a first embodiment of the invention.

In a first embodiment of the invention, the primary holes 100 that lie in the adjacent zones 60 are situated further downstream than the primary holes 100 that are situated outside the adjacent zones 60. This situation is shown in FIG. 2. The primary holes 100 that are to be found in the adjacent zones 60 are situated on a circumference centered on the longitudinal axis A in a first plane P1 perpendicular to said axis. The primary holes 100 that are situated outside the adjacent zones 60 are situated on a circumference in a second plane P2 parallel to the first plane and situated upstream from the first plane P1.

For example, and as shown in FIG. 2, the distance between the first plane P1 and the second plane P2 is equal to the diameter of a primary hole 100 (the planes P1 and P2 are parallel, and consequently the distance between these two planes is conventionally defined as being the length of a segment extending from one of the planes to the other plane perpendicularly to said planes). The distance between the first plane P1 and the second plane P2 may also be greater than the greatest dimension of a primary hole 100.

Alternatively, the distance between the first plane P1 and the second plane P2 may also be less than the greatest dimension of a primary hole 100.

The volume of the primary zone upstream from the primary holes 100 situated in the adjacent zone 60 is thus increased. This enables the re-ignition ceiling to be increased while conserving the levels of smoke and $NO_x$ that are emitted by the combustion chamber. Conversely, it is possible to conserve the value for the volume of the primary zone in the adjacent zone 60, i.e. to conserve the positions of the primary holes 100 in the vicinity of the spark plugs 36 (plane P1) as in the prior art shown in FIG. 4, while moving upstream the primary holes 100 that are situated outside the adjacent zones 60 (plane P2). This reduces the levels of smoke and $NO_x$ emitted by the combustion chamber while conserving the re-ignition ceiling. Thus, tests carried out by the inventors show that when the volume of the primary zone outside the adjacent zones 60 goes from 2.77 liters to 2.2 liters, a decrease is obtained in the smoke level having a value of 3 SN (where SN=smoke number, a unit used for measuring a quantity of smoke). Outside the zones 60 adjacent to the spark plugs 36, a 3% increase is also obtained in the margin relative to the known international civil aviation organization (ICAO) standard for $NO_x$ gas.

As shown in FIG. 2, and in comparison with FIG. 4, the upstream offset of the primary holes 100 that are outside the adjacent zones 60 compared with the primary holes 100 that are within the adjacent zones 60 is accompanied by an identical offset of the dilution holes 200, i.e. the distance between a primary hole 100 and the dilution hole 200 situated immediately downstream from the primary hole 100 along the direction of the axis A is substantially constant over the entire circumference of the combustion chamber 10. For each adjacent zone 60, the dilution holes 200 that are situated astride each of the two boundaries of the adjacent zone are offset by half the distance of the offset of the other dilution holes 200.

Alternatively, the dilution holes 200 need not be offset between the adjacent zones 60 and the portions of the outer side wall 12 outside the adjacent zones 60, i.e. all of the dilution holes 200 may be situated on the same circumference around the axis A.

The inner side wall 14 of the combustion chamber 10 may include primary holes 110 and dilution holes 210.

Advantageously, these primary holes 110 are at substantially the same distance relative to the chamber end wall 13 as are the primary holes 100 of the outer side wall 12 situated in each of the adjacent zones 60 adjacent to one of the spark plugs 36.

Thus, the primary holes 110 in the inner side wall 14 are situated substantially in register with the primary holes 100 of the outer side wall 12 in directions that are perpendicular to the side walls.

This arrangement makes it possible to define the volume of the primary zone more accurately from an aerodynamic point of view.

The dilution holes 210 may also be situated substantially in register with the dilution holes 200 of the outer side wall 12 situated in each of the adjacent zones 60 adjacent to one of the spark plugs 36.

In a second embodiment of the invention, the ratio $R_1$ of the air flow rate $\rho_{P1}$ passing via the primary holes 100 that are situated in the adjacent zones 60 to the air flow rate $\rho_{D1}$ passing via the dilution holes 200 that are to be found in the adjacent zones 60 is less than the ratio $R_2$ of the flow rate $\rho_{P2}$ of the air passing via the primary holes 100 that lie outside the adjacent zones 60 to the flow rate $\rho_{D2}$ of the air passing via the dilution holes 200 that are situated outside the adjacent zones 60. This situation is shown in FIG. 3.

Outside the adjacent zones 60, the flow rate $\rho_{P2}$ of air passing via the primary holes 100 is increased compared with the flow rate $\rho_{D2}$ of air passing via the dilution holes 200. This makes it possible to satisfy pollution standards. Nevertheless, in the adjacent zones 60 that surround the spark plugs 36, the ratio $R_1$ of the flow rate $\rho_{P1}$ of air passing via the primary holes 100 to the flow rate $\rho_{D1}$ of air passing via the dilution holes 200 is unchanged, thereby making it possible to conserve the desired high re-ignition ceiling.

Figure 3:
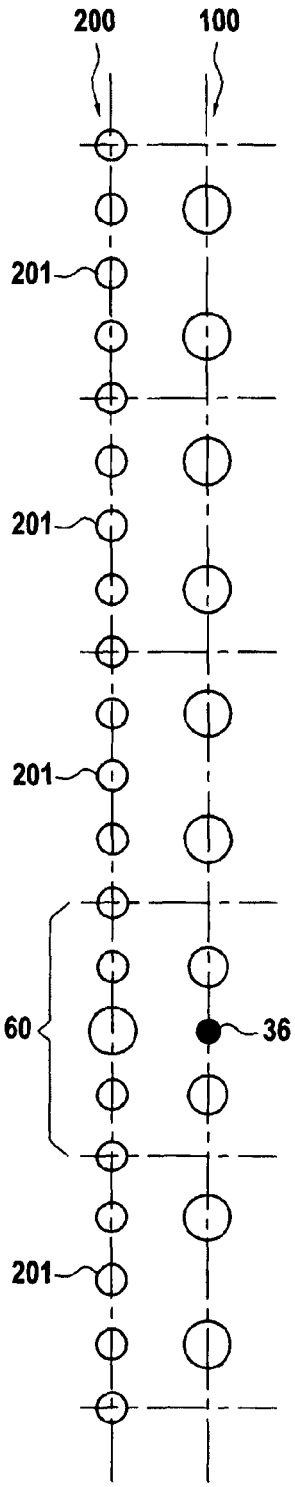
FIG. 3 is a perspective view of a portion of the outer side wall of a combustion chamber in a second embodiment of the invention.

As shown in FIG. 3, and in comparison with FIG. 4, the ratio $R_2$ of the flow rate $\rho_{P2}$ of air passing via the primary holes 100 that are situated outside the adjacent zones 60 to the flow rate $\rho_{D2}$ of air passing via the dilution holes 200 that are situated outside the adjacent zones 60 is increased by increasing the air flow rate $\rho_{P2}$ and by decreasing the air flow rate $\rho_{D2}$. These flow rate modifications are obtained by modifying the section of at least some of the primary holes 100 at the section of at least some of the dilution holes 200.

Thus, tests carried out by the inventors show that when the flow rate $\rho_{P2}$ of air passing via the primary holes 100 that lie outside the adjacent zones 60 is increased by 2% of the chamber flow rate to the detriment of the flow rate $\rho_{D2}$ of air passing via the dilution holes 200 that lie outside the adjacent zones 60, without modifying the flow rates of air passing via the primary holes 100 and the dilution holes 200 lying in the adjacent zones 60, a smoke level reduction of 2 SN is obtained.

These flow rate modifications may also be obtained either solely by increasing the flow rate $\rho_{P2}$ of air passing via the primary holes 100 that lie outside the adjacent zones 60, or solely by decreasing the flow rate $\rho_{D2}$ of air passing via the dilution holes 200 that lie outside the adjacent zones 60.

In FIG. 3 and in comparison with FIG. 4, the section of each of the primary holes 100 lying outside the adjacent zones 60 is increased compared with the section of each of the primary holes 100 lying within the adjacent zones 60. In parallel, for the dilution holes 200 lying outside the adjacent zones 60, the section of one dilution hole 201 in every four dilution holes 200, initially greater than the section of one of the other three dilution holes 200, is decreased to the section of one of the other three dilution holes 200, while the section of the four dilution holes 200 in the adjacent zones 60 remains unchanged: three of these dilution holes 200 each presents a section equal to the section of one of the other three dilution holes 200 that lie outside the adjacent zones 60, the remaining dilution holes 200 remaining with a section that is greater.

In general, according to the invention, the mean of the sections of the primary holes 100 that lie in the adjacent zones 60 is less than the mean of the sections of the primary holes 100 that lie outside the adjacent zones 60. For example, the section of each primary hole 100 that lies in an adjacent zone 60 is less than the section of each primary hole 100 that lies outside an adjacent zone 60. For example, the section of each of the primary holes 100 that lie in the adjacent zones 60 is substantially equal to half the section of each of the primary holes 100 that lies outside the adjacent zones 60.

Also or in addition, in general manner, according to the invention the mean of the sections of the dilution holes 200 that lie in the adjacent zones 60 is greater than the mean of the sections of the dilution holes 200 that lie outside the adjacent zones 60. For example, certain dilution holes 200 that lie in the adjacent zones 60 have a first section, the other dilution holes 200 that lie in the adjacent zones 60 having a second section that is less than the first section, while all of the dilution holes 200 that lie outside the adjacent zones 60 have a section equal to said second section. For example, some of the dilution holes 200 that lie in the adjacent zones 60 have a first section, the other dilution holes 200 that lie in the adjacent zones 60 having a second section equal to half the first section, while all of the dilution holes 200 that lie outside the adjacent zones 60 have a section equal to said second section.

Since the holes in FIG. 3 are circular, modifying their sections amounts to modifying their diameters.

Alternatively, it is possible, outside the adjacent zones 60, to maintain the ratio $R_2$ of the flow rate $\rho_{P2}$ of air passing via the primary holes 100 to the flow rate $\rho_{P2}$ of air passing via the dilution holes 200, and in the adjacent zones 60 to reduce the ratio $R_1$ of the flow rate $\rho_{P1}$ of air passing via the primary holes 100 to the flow rate $\rho_{D1}$ of air passing via the dilution holes 200. This reduction in the ratio $R_1$ may be performed by modifying the sections of these holes.

According to the invention, it is possible to combine the two embodiments, i.e. firstly to ensure that the primary holes 100 that lie outside the adjacent zones 60 are situated further upstream than the primary holes 100 that lie within the adjacent zones 60, and secondly to ensure that the ratio $R_1$ of the flow rate $\rho_{P1}$ of air passing via the primary holes 100 that lie in the adjacent zones 60 to the flow rate $\rho_{D1}$ of air passing via the dilution holes 200 that lie in the adjacent zones 60 is greater than the ratio $R_2$ of the flow rate $\rho_{P2}$ of air passing via the primary holes 100 that lie outside the adjacent zones 60 to the flow rate $\rho_{D2}$ of air passing via the dilution holes 200 that lie outside the adjacent zones 60.

Thus, tests carried out by the inventors show that when the volume of the primary air outside the adjacent zones 60 goes from 2.77 liters to 2.2 liters, and when the flow rate $\rho_{P2}$ of air passing via the primary holes 100 that lie outside the adjacent zones 60 is increased by 2% of the flow rate of the chamber to the detriment of the flow rate $\rho_{D2}$ of air passing via the dilution holes 200 that lie outside the adjacent zones 60, without modifying the flow rates of air passing via the primary holes 100 and the dilution holes 200 that lie in the adjacent zones 60, a reduction is obtained in the smoke level of 4 SN and outside the adjacent zones 60, a 4% increase is obtained relative to the ICAO standard for NO gas.

The inner side wall 14 of the combustion chamber 10 may include primary holes 110 and dilution holes 210.

Advantageously, these primary holes 110 are such that the flow rate of air passing via these primary holes 110 is substantially equal to the flow rate of air passing via the primary holes 100 in the outer side wall 12.

Thus, combustion within the chamber is more symmetrical, thereby contributing to increasing the lifetime of the gas turbine.

In all embodiments of the invention, the primary holes 100 and the dilution holes 200 are arranged in such a manner that pollution standards are satisfied and the desired high re-ignition ceiling is achieved and/or conserved.

The invention claimed is:

1. A combustion chamber for an aviation turbine engine, the combustion chamber being annular about a longitudinal axis, and comprising:
   an outer side wall, an inner side wall, and an annular chamber end wall connecting one end of the outer side wall to one end of the inner side wall,
   the outer side wall including, distributed along a circumference of the outer side wall, spark plugs, primary holes, and dilution holes situated downstream from the primary holes in a direction of the longitudinal axis,
   wherein the primary holes situated in each of adjacent zones adjacent to one of the spark plugs are situated further downstream than the primary holes situated outside the adjacent zones, and
   wherein the primary holes situated in the adjacent zones are situated level with the spark plugs.

2. A combustion chamber according to claim 1, wherein a distance between a first plane containing the primary holes that lie in the adjacent zones and a second plane that contains the primary holes that lie outside the adjacent zones is greater than a greatest dimension of one of the primary holes.

3. A combustion chamber according to claim 1, wherein the inner side wall includes primary holes that are situated substantially at a same distance from the chamber end wall as the primary holes of the outer side wall that are situated in each of the adjacent zones adjacent to one of the spark plugs.

4. A combustion chamber for an aviation turbine engine, the combustion chamber being annular about a longitudinal axis, and comprising:
- an outer side wall, an inner side wall, and an annular chamber end wall connecting one end of the outer side wall to one end of the inner side wall,
- the outer side wall including, distributed along a circumference of the outer side wall, spark plugs, primary holes, and dilution holes situated downstream from the primary holes in a direction of the longitudinal axis,
- wherein the primary holes situated in each of adjacent zones adjacent to one of the spark plugs are situated level with the primary holes situated outside the adjacent zones,
- wherein a ratio $R_1$ of flow rate of air passing via the primary holes to a flow rate of air passing via the dilution holes in an adjacent zone adjacent to one of the spark plugs is less than a ratio $R_2$ of the flow rate of air passing via the primary holes to the flow rate of air passing via the dilution holes outside the adjacent zones.

5. A combustion chamber according to claim 4, wherein a mean of sections of the primary holes that lie within the adjacent zones is less than a mean of sections of the primary holes that lie outside the adjacent zones.

6. A combustion chamber according to claim 4, wherein the section of each of the primary holes that lies within the adjacent zones is substantially equal to half the section of each of the primary holes that lie outside the adjacent zones.

7. A combustion chamber according to claim 4, wherein a mean of sections of the dilution holes that lie within the adjacent zones is greater than a mean of sections of the dilution holes that lie outside the adjacent zones.

8. A combustion chamber according to claim 7, wherein some of the dilution holes that lie within the adjacent zones have a first section, other dilution holes that lie within the adjacent zones having a second section equal to half the first section, while all of the dilution holes that lie outside the adjacent zones are of a section equal to the second section.

9. A combustion chamber according to claim 4, wherein the inner side wall includes primary holes that are such that a flow rate of air passing via the primary holes is substantially equal to a flow rate of air passing via the primary holes of the outer side wall.

* * * * *